United States Patent [19]

Pangle, Jr. et al.

[11] 3,981,836

[45] Sept. 21, 1976

[54] YARN SIZES, SIZING TREATMENTS AND RESULTING SIZED YARNS

[75] Inventors: James C. Pangle, Jr., Danville, Va.; Alton D. Hicks, Mauldin, S.C.

[73] Assignee: Dan River Inc., Danville, Va.

[22] Filed: Sept. 3, 1971

[21] Appl. No.: 177,827

Related U.S. Application Data

[60] Division of Ser. No. 744,292, July 12, 1968, Pat. No. 3,630,983, which is a continuation-in-part of Ser. Nos. 407,551, Oct. 29, 1964, abandoned, and Ser. No. 491,399, Sept. 29, 1965, and Ser. No. 670,787, Sept. 26, 1967.

[52] U.S. Cl. .................. 260/29.6 H; 260/29.6 TA; 260/29.6 R; 427/390; 260/864; 526/14; 526/26; 526/49; 526/271

[51] Int. Cl.² ........................................ D06M 15/14

[58] Field of Search ............... 260/29.6 TA, 29.6 H, 260/29.6 R

[56] References Cited

UNITED STATES PATENTS

| 2,469,407 | 5/1949 | Powers et al. ................. 260/29.6 N |
|---|---|---|
| 2,519,764 | 8/1950 | Jacobson ....................... 260/78.5 T |
| 2,717,247 | 9/1955 | Contis ............................ 260/78.5 T |
| 2,723,195 | 11/1955 | Blake ............................. 260/78.5 T |
| 2,757,153 | 7/1956 | Bowen ........................... 260/29.6 N |
| 2,864,808 | 12/1958 | Harris ............................ 260/29.6 TA |
| 3,030,342 | 4/1962 | Tiefenthal et al. ............. 260/78.5 T |

*Primary Examiner*—Lucille M. Phynes
*Attorney, Agent, or Firm*—Fisher, Christen & Sabol

[57] ABSTRACT

Textile size compositions which are dispersible in water and comprise an alkali metal and/or ammonium salt of a styrene-maleic anhydride copolymer, containing as a copolymerized component a diester of an olefinically unsaturated dicarboxylic acid or anhydride and a monohydric alcohol and/or a polyester of such an acid or anhydride and a polyhydric alcohol. Also, textile size compositions which are dispersible in water and comprise a mixed salt of a styrene-maleic anhydride copolymer, wherein 20 to 80 weight percent of the cations of said salt are ammonium cations and 20 to 80 weight percent of the cations of said salt are alkali metal cations. Methods for sizing yarns and yarn sized with the above-mentioned compositions.

8 Claims, No Drawings

YARN SIZES, SIZING TREATMENTS AND RESULTING SIZED YARNS

This is a division of application Ser. No. 744,292, filed July 12, 1968, now U.S. Pat. No. 3,630,983, which application is a continuation-in-part application of copending applications Ser. No. 407,551 filed Oct. 29, 1964, now abandoned, Ser. No. 491,399 filed Sept. 29, 1965, and Ser. No. 670,787 filed Sept. 26, 1967.

This invention relates to novel textile sizing compositions, methods of sizing yarns, threads and other textile materials therewith and the resulting sized yarn, threads or other textile materials.

It has been common practice to treat yarns, threads and other similar textile materials with starch dispersions for the purpose of sizing same and facilitating the construction of cloth and fabric therefrom. While such starch dispersions have been used to a considerable extent, they, nevertheless, have serious drawbacks which discourage continued widespread use thereof. For one thing, starch is not water soluble and in order to desize the yarns or threads after construction into cloth or fabrics, an enzyme or other special procedure was necessary. This not only increased the cost of utilizing starch sizes but also required additional steps or operations to permit the enzyme adequate time to act upon the starch. In addition, starch possesses a high biological oxygen demand, B.O.D., and discharge thereof into streams and rivers presents serious pollution problems.

Other types of textile sizes have been employed; for example, carboxymethylcellulose and other synthetic polymers, which are water soluble and have low B.O.D.'s U.S. Pat. Nos. 2,845,689 and 3,084,070 disclose typical synthetic polymer sizes known heretofore. Nevertheless, such sizes are extremely expensive to make and thus are undesirable. Copolymers of maleic anhydride and styrene or, more specifically, sodium salts thereof have also been employed as sizing materials but provide considerably less than maximum protection against abrasion and impart low weaving efficiencies to the yarn itself. Synthetic sizes heretofore known are either too tacky under the high humidity conditions under which fabric construction is conducted or are difficult to remove when desired. In some cases, prior synthetic sizes either penetrate the yarn to such an extent that the basic characteristics of the yarn are changed and/or the size is difficult to remove when desired.

According to the present invention, novel sizing compositions are obtained by making a copolymer of maleic anhydride, a monovinyl aromatic monomer having from 8 to 12 carbon atoms, e.g., styrenemaleic anhydride copolymers, and, as a copolymerized component, an unsaturated polyester of an olefinically unsaturated dicarboxylic acid or anhydride having from 4 to 10 carbon atoms to the molecule, and an alcohol selected from the class consisting of monohydric alcohols, e.g., alkanols, having from 6 to 27, preferably 10 to 18, carbon atoms and, thereafter, converting the resulting copolymer to the corresponding alkali metal salt, e.g., the sodium salt, or ammonium salt.

In one embodiment, an unsaturated diester derived from an unsaturated dicarboxylic acid and a monohydric alcohol is copolymerized with the maleic anhydride and the monomer. In another embodiment, a cross-linking unsaturated polyester derived from an unsaturated dicarboxylic acid and a polyhydric alcohol is copolymerized with the maleic anhydride and the monomer. Thereafter, at least some of the carboxyl groups of the resulting copolymers are converted to salt groups by reaction with alkali metal hydroxides, ammonium hydroxide or ammonia.

The resulting compositions are water soluble and can be applied to textile materials from water solutions thereof. They are readily removed after construction of the textile materials into cloth or fabric simply by means of washing with water of aqueous soap solutions. The wash solutions resulting from the removal of these sizing compositions from the textile materials have a low B.O.D. and produce very few, if any, problems upon discharge into rivers or streams.

The unsaturated diester is formed by condensing the olefinically unsaturated dicarboxylic acid or anhydride with the monohydric alcohol in the usual manner of forming condensates of this type. Typical monohydric alcohols include the alkanols having 6 to 27, preferably 10 to 18, carbon atoms, such as, hexanol, stearyl alcohol, 2-ethylhexanol, cetyl alcohol, myristyl alcohol, lauryl alcohol, n-decyl alcohol, n-octyl alcohol and cycloalkanols such as cyclohexanol. Typical olefinically unsaturated dicarboxylic acids and anhydrides include maleic anhydride, itaconic anhydride, citraconic anhydride, tetrahydrophthalic anhydride, methyltetrahydrophthalic anhydride and the like. Specific unsaturated diesters include distearyl maleate, di(2-ethylhexyl) maleate, dilauryl fumarate, dimyristyl itaconate, dihexyl citraconate, tetrahydrophthalate and the like. The mol ratio of the acid or anhydride to the alcohol can be widely varied and, for example, can range from 0.5 to 2 mols of acid or anhydride per mol of alcohol.

In the case of the diester-modified compositions, the cross-linking unsaturated polyester is formed by condensing the olefinically unsaturated dicarboxylic acid or anhydride with the polyhydric alcohol in the usual manner of forming polycondensates of this type. Typical polyhydric alcohols include the alkane diols and the polyoxyalkylene glycols, such as, ethylene glycol, propylene glycol, hexylene glycol, diethylene glycol, triethylene glycol, 1,5-pentane diol, 1,10-decane diol and the like. Typical olefinically unsaturated dicarboxylic acids and anhydrides include maleic anhydride, itaconic anhydride, citraconic anhydride, tetrahydrophthalic anhydride, methyltetrahydrophthalic anhydride and the like. The mol ratio of the acid or anhydride to the polyhydric alcohol can by widely varied and, for example, can range from 0.5 to 2 mols of acid or anhydride per mol of polyhydric alcohol. If desired, chain-stoppers such as monocarboxylic acids or anhydrides of monocarboxylic acids can be employed when a molar excess of alcohol over dicarboxylic acid or anhydride is employed and chain-stoppers such as monohydric alcohols can be employed when a molar excess of dicarboxylic acid or anhydride over the polyhydric alcohol is employed for the purpose of controlling molecular weight of the resulting polyester. When such chain-stoppers are employed, it is preferred to use 0.1 to 2 mols of monocarboxylic acid or anhydride per molar excess of the polyhydric alcohol over the dicarboxylic acid or anhydride. It is also preferred to employ 0.1 to 2 mols of monohydric alcohol per mol of excess dicarboxylic acid or anhydride over the mols of polyhydric alcohol employed.

It is also preferred to employ the anhydrides of dicarboxylic acids rather than the acids themselves in the formation of the diesters or polyesters so as to avoid the inconvenience of handling and/or disposing of the extra water of condensation resulting from the use of dicarboxylic acids.

The copolymer of maleic anhydride the monovinyl aromatic monomer and the unsaturated diester is prepared in the usual manner of preparing styrene-maleic anhydride copolymers, e.g., by mixing maleic anhydride with the monomer, diester and a suitable catalyst, such as a peroxide catalyst. Typical monovinyl aromatic monomers include styrene, vinyl toluene, monochloro styrene and the like. Suitable peroxide catalysts include benzoyl peroxide, lauroyl peroxide, cumene hydroperoxide, tertiary butyl hydroperoxide, tertiary butyl perbenzoate, methylethylketone peroxide, hydrogen peroxide and the like. The molar ratios of maleic anhydride to the monovinyl aromatic monomer can vary over a wide range, for example, from about 0.67 to about 10 mol of maleic anhydride per mol of monovinyl aromatic monomer. The amount of diester employed is in the range of about 0.01 to about 5.0, preferably about 0.1 to about 1.0, percent based on the weight of said copolymer. The amount of peroxide catalyst employed also is well known in the art and can vary over a wide range, e.g., 0.1 to 5.0 percent, based on the combined weight of maleic anhydride diester and said monomer.

More specifically, the diester-modified copolymeric compositions of this invention are made by mixing the maleic anhydride, said monomer and said diester. If desired, a solvent, such as, toluene, benzene, xylene and the like, can be employed, although it is not necessary. A peroxide catalyst such as one of those set forth above in added to the resulting mixture and thereafter heat is applied to raise the mixture to about 50° to 100°C. This elevated temperature is maintained for a sufficient time to copolymerize the maleic anhydride monovinyl aromatic monomer and diester. Suitable periods of time for heating range from 30 to 240 minutes. Thereafter, the resulting copolymer is allowed to cool to room temperature.

The copolymer of maleic anhydride and the monovinyl aromatic monomer is prepared in the usual manner by mixing maleic anhydride with the monomer and a suitable catalyst, such as a peroxide catalyst. Typical monovinyl aromatic monomers and suitable peroxide catalysts are listed above. The molar ratios of maleic anhydride to the monovinyl aromatic monomer can vary over a wide range as listed above and the amount of peroxide catalyst employed also is well known in the art and can vary over a wide range as listed above. Copolymers of maleic anhydride and styrene or other monovinyl aromatic monomer are well known in the art and reference is made to U.S. Pat. Nos. 2,586,477 and 3,084,070 for more detailed descriptions of some typical copolymers.

Copolymers of maleic anhydride and monovinyl aromatic monomer cross-linked with olefinically unsaturated polyesters are made by mixing the maleic anhydride, said monomer and said polyester in proportions of about 0.05 to about 8 percent, based on the combined weight of said monomer and maleic anhydride, of said unsaturated polyester. If desired, solvent such as those listed above can be employed, although it is not necessary. A peroxide catalyst such as those set forth above is added to the resulting mixture and thereafter heat is applied to raise the mixture to about 50° to 110°C. This elevated temperature is maintained for a sufficient time to copolymerize the maleic anhydride and monovinyl aromatic monomer and form cross-linkages in the copolymer by the polyester, Suitable periods of time for heating range from 30 to 240 minutes. Thereafter, the resulting copolymer cross-linked with the unsaturated polyester is allowed to cool to room temperature.

The higher viscosity of cross-linked copolymers is desirable so as to provide better fiber lay and better weaving efficiency. This viscosity of the cross-linked copolymer can be increased by increasing the amount of unsaturated polyester employed for cross-linking the polymers, Adequate viscosities are obtained by employing 1 to 2 percent or less of the cross-linking unsaturated polyester based on the combined weight of the styrene and maleic anhydride.

If desired, a diester-modified and cross-linked copolymer can be produced by reacting maleic anhydride, monomer, diester and cross-linking polyester, each in an amount in its respective range as set forth hereinabove. The same conditions can be used as specified above in respect to the preparation of the diester-modified and cross-linked copolymers.

An alkali metal hydroxide, preferably sodium hydroxide, in reacted with the resulting diester-modified and/or cross-linked copolymer in order to render it water soluble. The causticization of the copolymer can be carried out in accordance with well known procedures in the art. In this respect, the teachings of the above-mentioned United States patent relating to causticization of styrene-maleic anhydride copolymers can be applied to the present invention to causticize the copolymers of the present invention. Other alkali metal hydroxides can be employed, e.g., potassium of lithium hydroxide and, if desired, ammonium hydroxide or ammonia can be employed, to water-solubilize the copolymers.

In the slashing operation where the novel copolymer is applied to yarn, thread or other textile material, there can be employed about 1 to about 10, preferably about 4 to about 8, percent solids solution of the novel diester-modified and/or cross-linked copolymer in the sizing bath. Much higher or much lower percent solid solutions can be used, as desired. The preferred solvent is water and, as such, the water-soluble alkali metal or ammonium salts of the copolymer must be employed. It is also preferred to provide a size solution having a pH of about 7 or less so as to improve stability. It has been found that pH's from about 6.3 to about 6.8 provide optimum stability. The wet pick-up of the aqueous solution on the yarn can vary over a wide range, generally from about 80 to about 200 percent, based on the dry weight of the yarn. The amount of the water-soluble salt of the copolymer deposited on the yarn is not narrowly critical and can vary from about 3 to about 15 weight percent, based on the weight of the yarn. After application of the aqueous solution of said water-soluble salt, the moisture is driven off of the impregnated yarn by heating it to elevated temperatures, e.g., 225° to 280°F. The yarn is cooled and wound on beams or the like and then employed in construction of a fabric as by weaving. After construction the fabric is washed to remove the size if desired.

Instead of cotton yarn, yarns made from combinations of cotton fibers and synthetic fibers, such as polyester fibers, including Dacron, Fortrel and the like, can be sized according to this invention. In addition, the sizing compositions of this invention can be employed on rayon or rayon-cotton blends or any other synthetic fiber yarns, e.g., polyester yarns, such as polyethylene glycol terephthalate and the like, polyolefin yarns, nylon and polyacrylonitrile yarns.

The hot viscosity of the sizing composition is of considerable importance in providing a size on the yarn wherein, during the slashing operation, the size does not penetrate the yarn to such a great extent that the basic yarn characteristics are changed or that the size cannot be readily removed when desired. Of course, the size should penetrate to a sufficient extent to provide enough adherence that the size will stay on the yarn during handling and fabric construction. The cold viscosity of the size is also important and should be high enough that the size does not migrate into the yarn after slashing, drying and cooling. Optimum ranges of hot and cold viscosities depend upon the type of yarn being sized including such characteristics as the type of fiber, the twist multiple, weight, etc. and to some extent on the particular conditions of slashing. Representative viscosity ranges are 80 to 300 cps at 200°F. and 1000 to 8000 cps at 78°F. The hot and cold viscosities can be varied outside these ranges.

In the normal fabric construction operation, high humidity conditions are employed. Cotton yarns, for example, have maximum strength under high humidity conditions. When weaving synthetic yarns, for example, static electricity is minimized under high humidity conditions. Relative humidity of 70% or higher, therefore, is normally employed in the weaving operation.

Under such high humidity conditions many prior size films applied to yarns pick up moisture and become tacky and weak. This tackiness interferes with the weaving operation, causing yarn breakage, shedding, clinging, etc. Yarns sized with the compositions of the present invention are characterized by greatly reduced yarn breakage, shedding, clinging, etc., normally associated with the tackiness of the prior size films.

Sizes based on copolymers of maleic anhydride, a monovinyl aromatic monomer, e.g., styrene, with or without an unsaturated diester and/or an unsaturated cross-linking polyester according to this invention can be partly neutralized with an alkali metal hydroxide, e.g., sodium hydroxide, and partly neutralized with a volatile base, e.g., ammonium hydroxide, ammonia or volatile amines. Mixed salts of such copolymers having about 20 to about 80 weight percent ammonium cations and about 20 to about 80 weight percent alkali metal cations provide good size films on yarn. These percentages are based on the total number of carboxyl groups in the copolymer.

The mixed salts are preferably obtained by first reacting an alkali metal hydroxide with the copolymer and thereafter reacting the copolymer at lower temperatures, e.g., room temperature, with ammonium hydroxide. The total amount of alkali metal hydroxide and ammonium hydroxide should be at least sufficient to impart water solubility. It is preferred to reflux the alkali metal hydroxide and copolymer in the presence of water so as to hydrolyze any combined anhydride present. However, it is also preferred to limit the temperatures of reacting ammonium hydroxide and subsequent drying of the resulting copolymeric salt so that excessive ammonia is not driven off.

The following examples are presented. All parts and percentages are on a weight basis unless otherwise indicated.

EXAMPLES 1–12

In each of the following Examples 1 through 12, the unsaturated dibasic acid, polyhydric alcohol or monohydric alcohol or monocarboxylic acid, if any, as indicated were mixed in the respective molar proportions given in Table I below. The resulting mixtures were each heated at 250°F. for a period of 60 minutes. At the end of this time, the temperature was lowered to room temperature.

Table 1

| Example No. | Mols of Maleic Anhydride | Polyhydric Alcohol Name | Mols | Other Name | Mols |
|---|---|---|---|---|---|
| 1. | 3 | Ethylene glycol | 4.5 | Oleic Acid | 0.5 |
| 2. | 4.5 | Ethylene glycol | 3.0 | Oleyl Alcohol | 0.5 |
| 3. | 0.5 | Propylene glycol | 0.25 | 1-Octadecanol | 0.5 |
| 4. | 0.5 | Hexylene glycol | 0.25 | 1-Octadecanol | 0.5 |
| 5. | 0.5 | Triethylene glycol | 0.25 | 1-Octadecanol | 0.5 |
| 6. | 0.5 | Diethylene glycol | 0.25 | 1-Octadecanol | 0.5 |
| 7. | 0.5 | 1.8 Pentane Diol | 0.25 | 1-Octadecanol | 0.5 |
| 8. | 0.5 | 1.10 Decane Diol | 0.125 | 1-Octadecanol | 0.7 |
| 9. | 4.57 | 1.10 Decane Diol | 2.29 | 1-Octadecanol | 2.28 |
| 10. | 0.25 | 1.10 Decane Diol | 0.40 | — | — |
| 11. | 1.14 | 1.10 Decane Diol | 0.5 | 1-Octadecanol | 1.14 |
| 12. | 0.5 | 1.10 Decane Diol | 0.25 | — | — |

EXAMPLES 13–20

In each of Examples 13 through 20, styrene, maleic anhydride and an unsaturated polyester of the type indicated in Table II below were mixed in the weight percents of polyester as indicated in Table II below, based on the total weight of said monomer and maleic anhydride. In each mixture 1.16 mols of styrene per mol of maleic anhydride were used.

Benzoyl peroxide in the amount of 0.002 gram per gram of styrene and maleic anhydride was added to the mixture and the mixture was heated at 190° to 230°F. for a period of about 120 minutes in order to produce styrene-maleic anhydride copolymers cross-linked with said unsaturated polyester. At the end of this time, the resulting cross-linked copolymer was cooled to room temperature.

Caustic soda in the amount of 0.2 gram per gram of cross-linked copolymer was added and the resulting mixture was heated to 194°F. for 20 minutes to form the sodium salt of the cross-linked copolymer.

Each of the resulting sodium salts of the cross-linked copolymers was dissolved in water to form aqueous solutions in the weight percents indicated in Table II. These respective solutions had the pH's and the viscosities at about 70°F. as indicated in Table II below.

The aqueous solution of Example 19 was applied to cotton yarn to a 130 percent wet pick-up based on the weight of the yarn and the yarn was then heated over cans to 220°F. to 230°F. to drive off substantially all of the moisture. Thereafter, the yarn was tested for weaving efficiency by the following procedure: The treated yarn was used in a production loom over a period of 120 hours. The number of picks was counted over this period and divided by the number of picks which the loom was capable of doing if no breaks occurred for the same period. This provided a value which, when multiplied by 100, gave the weaving efficiency. The weaving efficiency of yarn sized with the solution of Example 19 was 94.9% and the weaving efficiencies of yarn sized with the aqueous solutions of the remaining examples were of the same order of magnitude.

Table II

| Example No. | Unsaturated Polyester | | Weight % Aqueous Solution | pH | Viscosity |
|---|---|---|---|---|---|
| | Ex. No. | Wt. % | | | cps |
| 13. | 1 | 1.2 | 5 | 7.5 | 1400 |
| 14. | 2 | 0.8 | 6.3 | 7.0 | 1700 |
| 15. | 3 | 4.0 | 6.2 | 7.0 | 7500 |
| 16. | 6 | 4.0 | 6.3 | 6.9 | 1000 |
| 17. | 9 | 4.0 | 4.8 | 7.5 | 960 |
| 18. | 10 | 1.0 | 5.0 | 7.9 | 1300 |
| 19. | 11 | 4.0 | 4.9 | 7.6 | 1100 |
| 20. | 12 | 0.8 | 5.0 | 8.2 | 1900 |

EXAMPLE 21

A mixture was prepared from 200 grams toluene, 28 grams styrene, 22 grams maleic anhydride, 1 gram distearyl fumarate, 0.05 gram of an unsaturated polyester of maleic anhydride and 1,10-decane diol (Example 12) and 1 gram di(2-ethylhexyl) maleate. The mixture was placed into a kettle and covered with a blanket of $CO_2$. The kettle and contents were heated to 80°C. and 0.05 gram benzoyl peroxide dissolved in 5 ml to toluene was added. The mixture was maintained at a temperature of 80°C. for about 45 minutes. The temperature was raised to 98°C. and 0.05 gram of benzoyl peroxide dissolved in 5 ml of toluene was added, Heating was continued for about 20 minutes, at which time the temperature was 110°C. The $CO_2$ was shut off and refluxing was continued for about 1 hour. The mixture was cooled to about 90°C. and 10 grams of sodium hydroxide in 17 cc water were added. Thereafter the toluene and water in the mixture were distilled off and the resulting copolymeric salt was dried in the kettle. A 4.65% aqueous solution of the copolymeric salt had the following viscosities at a pH of 6.7 and the temperatures as listed:

| Temperature °F. | Visc-0(cps) | Visc-1(cps) | Visc-2(cps) |
|---|---|---|---|
| 195 | 170 | 140 | 100 |
| 190 | 200 | 150 | 100 |
| 180 | 260 | 180 | 120 |
| 78 | 6000 | 4050 | 1950 |

Visc-0 represents the viscosity of the solution without heating.
Visc-1 represents the viscosity of the solution after heating at 200°F. for one hour.
Visc-2 represents the viscosity after heating at 200°F. for two hours.

This solution was applied to cotton yarn, dried thereon and the yarn showed especially high weaving efficiency.

EXAMPLE 22

A mixture was prepared from 200 grams toluene, 28 grams styrene, 22 grams maleic anhydride, 0.5 gram di(2-ethylhexyl) maleate, 1.5 grams distearyl fumarate and 1 ml isoprene. The mixture was placed in a kettle and nitrogen was passed into the kettle to exclude oxygen from the mixture. 0.05 Gram benzoyl peroxide in 5 ml toluene was added and the mixture was heated at 60° to 65°C. and became cloudy after about 20 minutes. A solution of 0.05 gram benzoyl peroxide in 5 ml toluene was added and the temperature was increased to 72°C. and the nitrogen was shut off. The temperature of the mixture was taken up slowly to 110°C. and refluxed at about said temperature for about one hour. The mixture was then cooled to 90°C. and 10 grams of sodium hydroxide in 25 cc water were added. The mixture was heated to distill off 82 grams of toluene and 20 cc of water to result in 158 grams of wet copolymeric salt which was then dried to 61 grams.

An aqueous solution having a pH of 6.1 was made up to a total of 300 grams using 16 grams of the resulting copolymeric salt. The solution had a viscosity of 14,400 cps at a temperature of 200°F. The pH of the solution was adjusted to 7 and its viscosity was measured to be 7600 cps at a temperature of 200°F. The solution was adjusted to a pH of 7.5 and its viscosity measured to be 3000 cps at a temperature of 200°F. Thereafter the solution was heated for 1 hour at 200°F. and its viscosity was measured to be 2250 cps at 200°F. The solution had a solids content of about 0.5%. A clear, slick, flexible film made by drying the solution had an initial tensile strength of 32.2 psi and an initial elongation of 6.6%. The film was allowed to stand for 24 hours at which time it had a tensile strength of 23.4 psi and an elongation of 6.6%.

When applied to and dried on yarn, the solution provided a size which greatly improved the weaving efficiency of the yarn.

EXAMPLE 23

A mixture was prepared from 1800 grams of toluene, 252 grams styrene, 198 grams of maleic anhydride, 6.3 grams of distearyl maleate, 2.7 grams of di(2-ethylhexyl) maleate and 0.36 gram of an unsaturated polyester prepared from maleic anhydride and 1,10-decane diol prepared in the manner described in Example 12. The mixture was placed in a kettle and nitrogen was passed into the kettle. The kettle and contents were heated to 80°C. over about 20 minutes and, at that point, 0.45 gram benzoyl peroxide dissolved in 45 cc toluene was added. The temperature of the mixture remained at about 80°C. and rose to 98°C. over a period of about 30 minutes, at which point 0.45 gram benzoyl peroxide dissolved in 45 cc toluene was added. The temperature of the mixture was slowly raised to 110°C. over a period of about 20 minutes, at which point the nitrogen was shut off and the mixture was refluxed for an additional 1 hour. After refluxing, the mixture was cooled to about 90°C, and 57 grams of sodium hydroxide dissolved in 90 grams of water were added. The mixture was heated to distill off about 80% of the water contained by it as well as contained toluene and the temperature was lowered to room temperature. Thereafter, 68 cc of a 30% aqueous ammonium hydroxide solution was added to the mixture and the mixture was stirred for about 30 minutes. Thereafter, the mixture was dried to remove remaining water and toluene to provide the copolymeric salt.

A solution of about 6.3% solids was prepared from the copolymeric salt having a pH of about 6.5. The viscosity of the solution at 78°F. was 2870 cps and at 200°F. was 190 cps. The solution was heated 1 hour at 200°F. and was found to have viscosities of 1800 cps at 78°F. and 150 cps at 200°F. The solution was heated for another hour at 200°F. and was found to have viscosities of 1450 cps at 78°F. and 120 cps at 200°F. The solution was heated for another hour at 200°F. and was found to have viscosities of 1250 cps at 78°F. and 100 cps at 200°F.

A clear, slick and flexible film was thereafter made from the solution. The film had an initial tensile strength of 63 psi and an initial elongation of 3.3%. After standing 24 hours the film had a tensile strength of 50 psi and an elongation of 8%.

The copolymeric salt prepared above was applied to all-cotton yarn by the following procedure. A 6.8% solids aqueous soluton was made up from the copolymeric salt and had a viscosity of 200 cps at 200°F. The solution was placed in the size box of a slasher and the slasher was operated under the following conditions:

| Leases | 4 | 55 ends per lease |
|---|---|---|
| Size box temp. | | 204°F. to 200°F. |
| Drying cans temp. | | 1&2 – 260°F. |
| | | 3&4 – 250°F. |
| Tension warp | | cans to beam |
| | | 2 weights plus carrier |
| Split rods | | 2 plus bunt rod |
| Speed | | 20 ypm |

The sized yarn was woven into a cotton fabric having 112 ends per inch, 26's warp yarn and 75 picks per inch, 30's filling yarn. The weaving was conducted at relative humidities of 70, 75, 78 and 80 to 88%. No yarns sized with the copolymeric salt broke during the weaving operation whereas the same kind of yarns sized with carboxymethylcellulose broke on numerous occasions during concurrent weaving. There was no clinging at all of yarns sized with the copolymeric salt at relative humidities of 70, 75 and 78%. There was only slight clinging on slack sections of the warp of yarns sized with the copolymeric salt when woven at relative humidities of 88%. Yarns sized with the copolymeric salt gave no more shedding than yarns sized with carboxymethylcellulose woven concurrently therewith.

EXAMPLE 24

A copolymeric salt was prepared in the manner described in Example 23 and oven dried to remove water and toluene. Sixteen grams of the copolymeric salt were used to make a 300 gram aqueous solution having an initial pH of 5.95 and a viscosity of 3800 cps at 78°F. The pH was adjusted to 6.5 and the solution had viscosities of 1040 cps. at 78°F. and 120 cps. at 200°F. at this pH. After heating the solution for one, two and three hours the following viscosities were obtained:

| Hours of heating | cps at 78°F. | cps at 200°F. |
|---|---|---|
| 1 | 1000 | 120 |
| 2 | 950 | 106 |
| 3 | 700 | 96 |

A film which was clear, slick and flexible was made from the solution and was found to have an initial tensile strength of 55.5 p.s.i.

Another batch of copolymeric salt was prepared in the manner described in Example 23 and was dried to 91% solids in an evaporating dish. A 7.8% aqueous solution was made from the copolymeric salt and had an initial pH of 5.6. The pH was adjusted to 6.5 and the solution had the following viscosities initially and after heating for the hours indicated at 200°F:

| Hours at 200°F. | cps at 78°F. | cps at 200°F. |
|---|---|---|
| 0 | 4950 | 240 |
| 1 | 5100 | 190 |
| 2 | 4100 | 170 |
| 3 | 4100 | 160 |

A film was made from an 8.03% solids aqueous solution of the salt. The film was clear, slick and flexible and had an initial tensile strength of 84.5 p.s.i. and an initial elongation of 7.6%.

The copolymeric salts prepared above were mixed together and a 7.4% solids aqueous solution was prepared and placed in the size box of a slasher. The initial viscosities of the solution were 5500 cps. at 78°F. and 174 cps. at 200°F. A 50-50 cotton-Fortrel polyester blend yarn was run through the slasher under the following conditions:

| Leases | 4 | 55 ends per lease |
|---|---|---|
| Size box temp. | | 204°F. to 200°F. |
| Roll press | | 15 |
| Drying cans temp. | | 1&2 – 290°F. |
| | | 3&4 – 270°F. |
| Tension warp | | cans to beam |
| | | 2 weights plus carrier |
| Split rods | | 2 plus bust rod |
| Speed | | 27 to 30 y,p,m, |

Six sections of 100 yards per section and 220 ends per creel were run through the slasher. After slashing, the size solution was 6.75% solids and had a viscosity of 120 cps at 200°F. and 3500 cps at 78°F. The amount of copolymeric salt deposited on the yarn ranged from 7.7 to 8.7% based on the dry weight of the yarn.

A fabric having 112 ends per inch, 24's warp yarn and 60 picks per inch, 16's filling yarn was constructed from the sized warp yarns. The loom was run at 70% relative humidity and also at 80% relative humidity. The yarns sized with the copolymeric salt showed no clinging at both relative humidities and the amount of shedding was about half of that obtained from yarns sized with standard carboxymethylcellulose size.

EXAMPLE 25

A mixture was prepared from 1200 grams toluene, 168 grams styrene, 132 grams maleic anhydride, 4.2 grams distearyl maleate, 1.8 grams di(2-ethylhexyl) maleate and 0.18 gram of the unsaturated polyester prepared in a manner similar to that described in Example 23. The mixture was placed in a kettle and nitrogen passed into the kettle while the temperature rose to 80°C. over 20 minutes. At this point, 0.3 gram benzoyl peroxide in 20 cc toluene was added. The temperature remained at 80°C. and then rose to about 98°C. over a period of 30 minutes. At this point, 0.3 gram benzoyl peroxide in 20 cc toluene was added and the temperature slowly increased to 110°C. over 20 minutes. The nitrogen was shut off and the mixture refluxed for one hour. Thereafter, the mixture was divided into 6 portions and neutralized as follows:

Portion 1 - 6.6 grams sodium hydroxide dissolved in 8 cc. water were added to the solution at 25°C. and stirred 15 minutes. Then, 7 cc of a 30% aqueous ammonium hydroxide solution were added at 25°C. and stirred for 15 minutes. Then the water and toluene were distilled off.

Portion 2 - Same as Portion 1 except that 7.1 grams sodium hydroxide in 9 cc. water and 6 cc. of a 30% ammonium hydroxide aqueous solution used.

Portion 3 - Same as Portion 1 except that 7.6 grams sodium hydroxide in 10 cc water and 5 cc of a 30% aqueous ammonium hydroxide solution used.

Portion 4 - Same as Portion 3 except that 7 cc. water distilled off before addition of ammonium hydroxide. 5 cc Water and 96 cc. toluene distilled off after addition of ammonium hydroxide.

Portion 5 - Same as Portion 2 except ammonium hydroxide added first and sodium hydroxide added thereafter.

Portion 6 - Same as Portion 5 except 4 cc. of a 30% aqueous ammonium hydroxide solution and 8.1 grams sodium hydroxide in 11 cc. water used.

Solutions having the initial percents solids and the initial pH's indicated in Table III below were prepared from each of the portions. Each of the solutions made from said portions had the following cold and hot viscosities, respectively, taken at 78 and 200°F except where indicated after heating for the indicated hours at 200°F.

Table III

| Portion | Initial % Solids | Initial pH | cps 78°F | Hours at 200°F. | | | | | | |
|---|---|---|---|---|---|---|---|---|---|---|
| | | | | 0 | 1 | | 2 | | 3 | |
| | | | | cps 200°F | cps 78°F | cps 200°F | cps 78°F | cps 200°F | cps 78°F | cps 200°F |
| 1 | 5.09 | 6.5 | 5400 | 170 | 21.50 | 90 | 1750 | 80 | 1700 | 80 |
| 2 | 4.8 | 6.5 | 2850 | 160 | 1200 | 70 | 950 | 60 | — | — |
| 3 | 5.01 | 6.5 | *5000 | 130 | 2850 | 84 | 2600 | 74 | 1450 | 66 |
| 4 | 5.0 | 6.4 | **3200 | 120 | 1750 | 100 | 1300 | 80 | 830 | 80 |
| 5 | 4.98 | 6.45 | 1400 | 90 | 800 | 65 | 750 | 60 | 550 | 60 |
| 6 | 5.05 | 6.5 | 6100 | 210 | 2970 | 100 | 1750 | 90 | 930 | 80 |

*At 82°F.
**At 80°F.

Films were prepared from solutions of portions 1 through 4 having the percent solids designated in Table IV below. Each film was clear, slick and flexible and had the initial tensile strengths and elongations indicated in the Table.

Table IV

| Portion | % Solids | Tensile psi | Elongation % |
|---|---|---|---|
| 1 | 5.1 | 48 | 5.3 |
| 2 | 4.8 | 58 | 8.0 |
| 3 | 5.0 | 49 | 6.0 |
| 4 | 5.0 | 43.2 | 7.0 |

Aqueous size solutions made up from each of portions 1 through 6 and applied to cotton yarn or 50–50 cotton/polyester blend yarns provided sized yarns having high weaving efficiency and little, if any, clinging when woven. Such sized yarns produce no more shedding than corresponding carboxymethylcellulose sized yarns.

EXAMPLE 26

A mixture was prepared from 1200 grams toluene, 148 grams styrene, 132 grams maleic anhydride, 4.8 grams distearyl maleate, 1.2 grams di(ethylhexyl) maleate and 0.12 gram of the unsaturated polyester prepared in a similar manner to that used in Example 23. The mixture was heated to 88°C. with nitrogen bubbling through and held there for 5 minutes. .3 Gram benzoyl peroxide in 30 cc toluene was added and the temperature was raised to 100°C. over a period of about 40 minutes and .3 gram benzoyl peroxide in 30 cc toluene was added. The solution was refluxed for 1 hour. Then it was cooled to 25°C. and 36 grams sodium hydroxide in 54 cc water were added. Thereafter, ammonia gas was bubbled through the solution for 30 minutes for a total of 9.8 liters ammonia (measured at 25°C. and 760 mm of mercury pressure). Thereafter, the solution was dried in a kettle. Sixteen grams of the resulting copolymeric salt were made up into a 300 gram aqueous solution having an initial pH of 6.2 and a viscosity of 4600 cps at 78°F. The viscosity and film properties of the copolymeric salt were found to be adequate and yarns sized with aqueous solutions of said copolymeric salt had high weaving efficiency and little, if any, clinging and a satisfactorily low level of shedding.

EXAMPLE 27

A mixture was made from 190 grams toluene, 26 grams styrene, 22 grams maleic anhydride, 1 gram distearyl fumarate and 0.05 gram of the unsaturated polyester prepared in the manner described in Example 12. Carbon dioxide was bubbled through the mixture while increasing the temperature to 82°C. over a period of about 20 minutes. 0.05 Gram of lauroyl peroxide was added and the mixture was maintained at a temperature of 82°C. and then raised to 98°C. over a period of about 30 minutes. 0.05 Gram lauroyl peroxide was added and the temperature was raised to 110°C. slowly over a period of about 15 minutes. Carbon dioxide was shut off and the mixture was refluxed for one hour. The temperature was reduced to 98°C. and 5 grams of sodium hydroxide in 10 ml water were added. About 8 ml water were distilled off and the solution was cooled to 25°C. Fifteen grams of a 30% aqueous ammonium hydroxide solution were added slowly with stirring. Thereafter, the solution was filtered and dried in an oven to provide the copolymeric salt.

A 4.45% solids solution was prepared and the following viscosities were measured at the pH's indicated:

|  | pH 6.6 | | pH 7 | |
|---|---|---|---|---|
| cps | initial cps | cps after one hour at 200°F. | initial cps | cps after one hour at 200°F. |
| At 195°F. | 950 | 270 | 210 | 130 |
| At 78°F. | 8050 | 5050 | 3500 | 2550 |

Clear, slick films were made from the solution and had an initial tensile strength and elongation of 51.7 p.s.i. and 6.6%, respectively.

When applied to cotton yarn, solutions of the copolymeric salt provided high weaving efficiency, no clinging and acceptable low levels of shedding.

EXAMPLE 28

A mixture was prepared from 28 pounds styrene, 22 pounds maleic anhydride, 500 pounds toluene, 0.2 pound distearyl maleate and 0.25 pound of lauroyl peroxide. The mixture was placed into a 100 gallon glass-linked Pfaudler kettle and covered with a blanket of gaseous nitrogen. The kettle and contents were heated over a period of about 26 minutes to increase the temperature to the range of 138°F. to 145°F. and the temperature was maintained in this range for approximately 4.25 hours. The temperature was then increased over the next 23 minutes, approximately, to 195°F. at which time the nitrogen was shut off. Thereafter, the temperature was increased to 225°F. over a period of 1.25 hours and then the kettle and contents were permitted to cool to room temperature.

The resulting reaction mixture containing the copolymer of styrene maleic anhydride and distearyl maleate was then filtered and dried to obtain fifty pounds of the acid form of the polymer having a molecular weight of about 255,000 by the light scattering method.

An aqueous solution having a pH of 6.5 was made up to a total of 430 pounds using 30 pounds of the copolymeric salt produced above, 5.9 pounds of sodium hydroxide and 1.2 pounds of hydrogenated tallow. This solution hereinafter is called Size A.

A second aqueous solution hereinafter called Size B was prepared for comparison purposes and does not illustrate the invention. Size B was made from a copolymer produced from styrene and maleic anhydride as the only polymerizable materials in accordance with Example II of U.S. Pat. No. 2,872,436 having a molecular weight of about 2,400,000 as determined by the light scattering method. To form Size B the resulting copolymer was reacted with sodium hydroxide so as to form the sodium salt thereof in accordance with U.S. Pat. No. 3,084,070. An 8 weight percent solution of the resulting sodium salt was formed and found to have a pH of about 7.4. An attempt to use Size B in a slasher showed that, due to the relatively high viscosities, as shown in Table V below, the copolymeric sodium salt of Size B deposited and built up on the squeeze rolls of the slasher. This resulted in Size B overflowing the slasher box, thus establishing its unsuitability in production slashing.

In order to utilize Size B, its pH was increased to 9 by adding additional sodium hydroxide. This reduced the viscosity to a level suitable for use in production slashers. The resulting size, hereinafter called Size C, had the viscosities at the listed temperatures as shown in Table V below. Size C is presented for comparison purposes and does not illustrate the present invention.

Table V

| Temp. °F. | Viscosity, cps | | |
|---|---|---|---|
| | Size A | Size B | Size C |
| 200 | 140 | 3100 | 370 |
| 190 | 160 | 3425 | 410 |
| 78 | 730 | 6950 | 1500 |

The film strength and elongation of films made from Sizes A and C were determined and are set forth in Table VI below. A comparison of various strengths shows that the film strength of Size A is more than twice as great as the film strength of Size C.

Table VI

| Size | Strength, psi | Elongation % |
|---|---|---|
| A | 3320 | 25.6 |
| C | 1540 | 29.3 |

Sizes A and C were used in a Callaway laboratory slasher to size a polyester-cotton-rayon blended yarn comprising 50% polyester, 44% cotton and 6% rayon. Thereafter, the sized yarns were woven in a C-5 production loom using a warp consisting of 2,640 ends, 50 yards in length. The amounts of shedding resulting from splitting the ends of yarns after slashing and in weaving yarns sized with Sizes A and C were measured and are set forth in Table VII below.

Table VII

| Shedding during | Amount of Shedding | |
|---|---|---|
| | Size A | Size C |
| Splitting | 190 mg per kg | 562 mg per kg |
| Weaving | 4.5 g per 1,000 picks | 10.85 g per 1,000 picks |

These results show that the amount of shedding from Size C was more than double that of Size A during splitting and weaving.

During continued weaving in the loom at different weaving room humidities, it was found that yarns sized with Size C resulted in far more loom stoppages due to lint ball formation than yarns sized with Size A. Table VIII below illustrates the comparative results.

Table VIII

| Weaving room humidity | Number of Loom Stoppages | |
|---|---|---|
| | Size A | Size C |
| 65 | 0 | 10 |
| 70 | 0 | 3 |
| 75 | 0 | 1 |
| 80 | 0 | 3 |

The above results establish Size A as providing adequately sized yarns for regular mill production whereas Size C is not suitable for regular mill production.

EXAMPLE 29

A mixture was prepared from 32,500 grams toluene, 2470 grams styrene, 1430 grams maleic anhydride, 4.0 grams distearyl maleate and 6.5 grams lauroyl peroxide. The mixture was placed in a kettle and the kettle was purged with nitrogen gas for 5 minutes. Thereafter, the temperature was raised to 55°C. and held at approximately this temperature for 2 hours. Thereafter, the temperature was raised to 65°C. and held for 30 minutes, then it was raised to 75°C. for 15 minutes, thereafter it was raised to 85°C. for 15 minutes and thereafter it was slowly raised to the reflux temperature and held there for 1 hour. The resulting toluene suspension was filtered and half of it was added to 40 pounds of water in a reactor and the toluene was evaporated. Then, the resulting solids were filtered. The same production was carried out on the remaining half of the toluene suspension. The solids were dried in a tumble dryer to provide a copolymer of styrene, maleic anhydride and distearyl maleate.

2140 Grams of this copolymer were placed in 38 pounds of water containing 272 grams of caustic, to form a sizing solution.

Various film and solution characteristics of the resulting size were determined and set forth in Table IX below wherein corresponding characteristics of other sizing materials are presented.

Table IX

| Water Soluble Size | PHm Properties Tensile Strength, psi | | Elongation % | Soln. | Viscosity, cps at 78°F |
| --- | --- | --- | --- | --- | --- |
| | 0% R.H. | 50% R.H. | | | |
| Polyvinyl alcohol | 10,000–22,000 | 6,000–11,800 | up to 60% | 4% | 4–65 |
| Carboxymethyl cellulose | Unknown | 8,300 | 8.3% | 5% | 500–1200 |
| Stymor | Unknown | 2,800 | 2% | 5% | 50–60 |
| Ex. 2 Size | 8,000 | 5,000 4,000(65%) | up to 30% | 5% | 500–1200 |

The yarns sized with the size of the Example were woven on a C-5 loom. There was no clinging of ends in running 22,000 picks at 65% R.H., 22,000 picks at 70% R.H., 22,000 picks at 75% R.H. and 19,000 picks at 80% R.H. The amount of shedding during the entire 85,000 picks run was 3.2 grams per thousand picks. Warps sized with this size, thus, possessed excellent weaving characteristics.

EXAMPLE 30

A mixture was prepared from 125 grams toluene, 7.0 grams styrene, 5.5 grams maleic anhydride, 0.02 gram distearyl fumarate and 0.062 gram lauroyl peroxide. The mixture was placed into a vessel and covered with a blanket of nitrogen. The vessel and contents were slowly heated to 60°C. and maintained at a temperature of 60°C. for about 4 hours. The temperature was raised to reflux (about 111°C.) and held there for about one hour. The resulting mixture was cooled and filtered with suction. The resulting solid was dried overnight at 110°C. to provide a white powder product.

A size solution was prepared by dissolving 8.3 grams of the white powder product in an aqueous solution containing 1.7 grams of sodium hydroxide in 110 grams of water by stirring at the boiling point. The resulting solution was adjusted to a pH of 6.5 by adding a little caustic solution and thereafter had an 8.08% solids content. The resulting size solution had the following viscosities at the temperatures listed:

| Temperature °F. | Viscosity (cps) |
| --- | --- |
| 200 | 180 |
| 190 | 186 |
| 180 | 190 |
| 78 | 740 |

It should be understood that numerous other modifications and adaptations of the present invention will be obvious to skilled workers in the art without departing from the spirit and scope of this invention as designated by the appended claims.

What is claimed is:

1. A textile size composition dispersible in water comprising a mixed salt of a styrene-maleic anhydride copolymer, 20 to 80 weight percent of the cations of said salt being ammonium cations and 20 to 80 weight percent of said cations being alkali metal cations.

2. A composition for treating textile materials which comprises an aqueous solution of a mixed salt of an interpolymer wherein said interpolymer comprises
   a. 1.0 molar proportion of at least one carboxylic monomer selected from the group consisting of maleic anhydride,
   b. from 0.1 to 1.5 molar proportion of at least one monovinyl aromatic monomer containing from 8 to 12 carbon atoms, and
the total of monomer (b) being at least 1.0 molar proportion; and wherein
   a'. from 20 to 80% of the free carboxyl groups of said interpolymer are combined with at least one fixed base selected from the group consisting of alkali metal bases, and
   b'. from 20 to 80% of the free carboxyl groups of said interpolymer are combined with at least one fugitive base selected from the group consisting of ammonia, ammonium hydroxide and volatile amines,
such that a total of from 40 to 100% of said free carboxyl groups are so combined.

3. The composition as in claim 2 wherein the carboxylic monomer is maleic anhydride and the monovinyl aromatic monomer is styrene.

4. The composition as in claim 2 wherein the fixed base is sodium hydroxide and the fugitive base is ammonia or ammonium hydroxide.

5. A composition for treating textile materials which comprises an aqueous solution of a mixed salt of an interpolymer comprising 1.0 molar proportion of maleic anhydride and from 1.0 to 1.5 molar proportion of styrene, and wherein
   a'. from 20 to 80% of the free carboxyl groups of said interpolymer are combined with at least one fixed cation derived from the group consisting of alkali metal bases, and b′. from 20 to 80% of the free carboxyl groups of said interpolymer are combined with at least one fugitive cation derived from the group consisting of ammonia, ammonium hydroxide and volatile amines, such that a total of from 40 to 100% of said free carboxyl groups are so combined.

6. The composition as in claim 5 wherein the fixed base is sodium hydroxide and the fugitive base is ammonia or ammonium hydroxide.

7. A textile material treated with the composition of claim 2.

8. A textile material treated with the composition of claim 5.

* * * * *